United States Patent
Achten et al.

(10) Patent No.: US 9,475,971 B2
(45) Date of Patent: Oct. 25, 2016

(54) WATERBORNE POLYURETHANE ADHESIVE COMPOSITION AND METHOD FOR BONDING ARTICLES

(75) Inventors: Dirk Achten, Leverkusen (DE); Wolfgang Arndt, Dormagen (DE); Harald Kraus, Leverkusen (DE); Jan Weikard, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 13/989,532

(22) PCT Filed: Nov. 24, 2011

(86) PCT No.: PCT/EP2011/070940
§ 371 (c)(1),
(2), (4) Date: Jun. 19, 2013

(87) PCT Pub. No.: WO2012/069587
PCT Pub. Date: May 31, 2012

(65) Prior Publication Data
US 2013/0273375 A1    Oct. 17, 2013

(30) Foreign Application Priority Data
Nov. 26, 2010   (EP) .................................... 10192671

(51) Int. Cl.
| | | |
|---|---|---|
| *C09J 175/00* | (2006.01) | |
| *C08F 283/00* | (2006.01) | |
| *C08G 18/08* | (2006.01) | |
| *C08G 18/70* | (2006.01) | |
| *C09J 175/04* | (2006.01) | |

(52) U.S. Cl.
CPC .......... *C09J 175/00* (2013.01); *C08F 283/006* (2013.01); *C08G 18/0819* (2013.01); *C08G 18/706* (2013.01); *C09J 175/04* (2013.01); *C08G 2170/80* (2013.01); *C08G 2170/90* (2013.01); *Y10T 156/1051* (2015.01); *Y10T 428/31551* (2015.04)

(58) Field of Classification Search
CPC .......... C08F 283/006; C08G 18/0819; C08G 18/706; C08G 2170/80; C08G 2170/90; C09J 175/00; C09J 175/04; Y10T 428/31551; Y10T 156/10; Y10T 156/1051
USPC ............. 428/423.1; 156/273.3, 227; 522/174
See application file for complete search history.

(56) References Cited

U.S. PATENT DOCUMENTS

| 6,436,540 B1 * | 8/2002 | Garcia et al. .............. 428/423.1 |
| 6,797,764 B2 | 9/2004 | Sagiv et al. |
| 2003/0050347 A1 | 3/2003 | Faust et al. |
| 2003/0162892 A1 | 8/2003 | Maier et al. |
| 2007/0029034 A1 * | 2/2007 | Mgaya et al. ............. 156/275.5 |
| 2007/0141264 A1 * | 6/2007 | Satgurunathan et al. .... 427/384 |
| 2008/0041273 A1 * | 2/2008 | Baumgart et al. ........ 106/287.13 |
| 2008/0171208 A1 * | 7/2008 | Buchner et al. ........... 428/423.1 |
| 2008/0254234 A1 * | 10/2008 | Fink et al. .................... 427/595 |
| 2009/0240005 A1 * | 9/2009 | Kraus et al. .................. 525/458 |
| 2013/0273359 A1 * | 10/2013 | Arndt et al. .................. 428/345 |

FOREIGN PATENT DOCUMENTS

| DE | 10038958 A1 | 2/2002 |
| EP | 0936249 A1 | 8/1999 |

OTHER PUBLICATIONS

International Search Report for PCT/EP2011/070940 mailed Mar. 23, 2012.

* cited by examiner

*Primary Examiner* — Thao T Tran
(74) *Attorney, Agent, or Firm* — Drinker Biddle & Reath LLP

(57) ABSTRACT

The present invention relates to novel waterborne adhesives which are polymerizable by UV light and are capable of being activated by heat, and which particularly display good adhesion to difficult substrates, such as ethylene vinyl acetate copolymers (EVA) with a low vinyl acetate content, or rubber. The invention further provides a novel method in which, after the application of the waterborne adhesive to an article and drying, irradiation with UV light and at the same time or thereafter activation by heat are performed. The adhesive film which is irradiated and activated in this way is then bonded to a further article. The invention also provides the use of the adhesives to make items such as shoes.

10 Claims, No Drawings

WATERBORNE POLYURETHANE ADHESIVE COMPOSITION AND METHOD FOR BONDING ARTICLES

RELATED APPLICATIONS

This application is a national stage application (under 35 U.S.C. §371) of PCT/EP2011/070940, filed Nov. 24, 2011, which claims benefit of European Patent Application No. 10192671.5, filed Nov. 26, 2010, which is incorporated by reference herein.

The present invention relates to novel waterborne adhesives which are polymerisable by UV light and are capable of being activated by heat, and which particularly display good adhesion to difficult substrates, such as ethylene vinyl acetate copolymers (EVA) with a low vinyl acetate content, or rubber. The invention further provides a novel method in which, after the application of the waterborne adhesive to an article and drying, irradiation with UV light and at the same time or thereafter activation by heat are performed. The adhesive film which is irradiated and activated in this way is then bonded to a further article. The invention also provides the use of the adhesives to make items such as shoes.

Adhesives which are capable of activation by heat and are based on waterborne polymer dispersions are used more and more widely, since they allow thin adhesive films to be produced simply and quickly without in so doing releasing more than negligible quantities of volatile organic compounds such as solvents. In particular, polyurethane dispersions meet the most demanding requirements here of the loading capacity of the adhesive bonds. The activation by heat causes the crystalline or partly crystalline polymers to melt, becoming tacky, and after bonding they crystallise again and hence contribute to the strength of the bond. However, corresponding waterborne polyurethane dispersions have the disadvantage that they do not adhere, or do so only to an unsatisfactory extent, to various materials which are often used for example when making shoes, as soles or midsoles. To improve adhesion, the materials to be coated are pretreated for example by chlorination, ozone, plasma, or primers containing aggressive organic solvents, in combination with UV irradiation [J. Adhesion Sci. Technol., Vol. 19, No. 1, pp. 19-40 (2005)]. All these methods require additional steps in the method, chemicals which are disadvantageous to persons and the environment, and/or complex equipment. Waterborne coatings which cure as a result of thermal drying and UV light and are based on polyurethane dispersions are for example known from DE-A 10038958. However, these products have amorphous structures and cannot be activated by heat for the purpose of bonding, and so are unsuitable as adhesives.

It was surprising to find that, by combining UV-polymerisable monomers with dispersions based on crystalline or partly crystalline polyurethanes, polyureas or polyurethane polyureas, adhesives can be prepared which, firstly, after drying and UV irradiation adhere well to difficult substrates such as EVA and rubber and, secondly, despite the polymerisation of the UV-polymerisable monomers resulting in amorphous and partly cured structures after heat activation, were still sufficiently tacky for bonding.

The invention therefore provides a waterborne dispersion, containing
30.0-94.9 wt. % of at least one polymer selected from the group comprising polyurethanes, polyureas or polyurethane polyureas,
5.0-60.0 wt. % of at least one monomer which can polymerise by radical polymerisation,
0.1-10.0 wt. % of at least one photoinitiator, and
optionally, 0.5-15.0 wt. % of at least one crosslinking agent,
wherein the figures in weight percent relate to the solids content and add up to 100, and wherein when measured by DSC to DIN 65467 at a heating rate of 20K/min, the polymer has a melting peak corresponding to an enthalpy of fusion of >3 J/g.

Preferably, the polymer selected from the group comprising polyurethanes, polyureas and polyurethane polyureas has, when measured by DSC to DIN 65467 at a heating rate of 20K/min, a melting peak corresponding to an enthalpy of fusion of >15 J/g, particularly preferably >30 J/g, and most particularly preferably >50 J/g. The melting peak is caused by the fusion of regular crystalline structures in the polymer.

Preferably, the waterborne dispersion contains 50 to 90 wt. %, particularly preferably 70 to 85 wt. %, of at least one polymer selected from the group comprising polyurethanes, polyureas and polyurethane polyureas, in each case in relation to the solids content of the dispersion.

The invention further provides the use of the abovementioned waterborne dispersion as a heat-activatable adhesive.

The invention further provides a method for bonding articles, including at least the following steps:
I) coating an article with the waterborne dispersion according to the invention;
II) removing water;
III) irradiating with actinic radiation;
IV) simultaneously with or after III), introducing heat into the irradiated film;
V) bringing the article into contact with itself or a further article.

Preferably, the further article in step V) is also coated with the waterborne dispersion according to the invention or with another adhesive which is activated by heat.

Preferably, the article has not been treated with a primer before it is coated with a dispersion according to the invention.

The invention also provides the articles which are bonded by the method according to the invention, and items made therefrom.

The polymer is selected from the group comprising polyurethanes, polyureas and polyurethane polyureas. Corresponding polymers are known as waterborne dispersions and are available on an industrial scale. They are generally called polyurethane dispersions (PUDs).

As their structural components, the polyurethane, polyurea or polyurethane polyurea polymers contain:
(A) at least one diol and/or polyol component
(B) at least one di- and/or polyisocyanate component
(C) at least one component including at least one hydrophilising group
(D) optionally mono-, di- and/or triamine-functional and/or hydroxylamine-functional compounds, and
(E) optionally other isocyanate-reactive compounds.

Suitable diol- and/or polyol components A) are compounds having at least two hydrogen atoms which are reactive with isocyanates and have an average molecular weight of preferably 62 to 18000 and particularly preferably 62 to 4000 g/mol. Examples of suitable structural components are polyethers, polyesters, polycarbonates, polylactones and polyamides. Preferred polyols A) preferably have 2 to 4, particularly preferably 2 to 3 hydroxyl groups, and most particularly preferably 2 hydroxyl groups. Mixtures of different such compounds are also possible.

Possible polyester polyols are in particular linear polyester diols or indeed weakly branched polyester polyols, as can be prepared in known manner from aliphatic, cycloaliphatic or aromatic di- or polycarboxylic acids, such as succinic, methylsuccinic, glutaric, adipic, pimelic, suberic, azelaic, sebacic, nonanedicarboxylic, decanedicarboxylic, terephthalic, isophthalic, o-phthalic, tetrahydrophthalic, hexahydrophthalic, cyclohexane dicarboxylic, maleic, fumaric, malonic or trimellitic acid and acid anhydrides, such as o-phthalic, trimellitic or succinic acid anhydride or mixtures thereof with polyhydric alcohols such as ethanediol, di-, tri-, tetraethylene glycol, 1,2-propanediol, di-, tri-, tetrapropylene glycol, 1,3-propanediol, butanediol-1,4, butanediol-1,3, butanediol-2,3, pentanediol-1,5, hexanediol-1,6, 2,2-dimethyl-1,3-propanediol, 1,4-dihydroxycyclohexane, 1,4-dimethylol cyclohexane, octanediol-1,8, decanediol-1,10, dodecanediol-1,12 or mixtures thereof, optionally with the use of higher-functional polyols, such as trimethylol propane, glycerine or pentaerythritol. It goes without saying that cycloaliphatic and/or aromatic di- and polyhydroxyl compounds are also possible as the polyhydric alcohols for preparing the polyester polyols. Instead of free polycarboxylic acid, it is also possible to use the corresponding polycarboxylic acid anhydrides or corresponding polycarboxylic acid esters of low alcohols or mixtures thereof for preparing the polyesters.

It goes without saying that the polyester polyols may also be homopolymers or mixed polymers of lactones which are preferably obtained by the addition of lactones or lactone mixtures, such as butyrolactone, ε-caprolactone and/or methyl-ε-caprolactone, to suitable di- and/or higher-functional starter molecules, such as the low-molecular-weight polyhydric alcohols mentioned above as structural components for polyester polyols. The corresponding polymers of ε-caprolactone are preferred.

Polycarbonates having hydroxyl groups are also possible as the polyhydroxyl components A), e.g. those which can be prepared by reacting diols such as 1,4-butanediol and/or 1,6-hexanediol with diaryl carbonates, such as diphenyl carbonate, dialkyl carbonates, such as dimethyl carbonate, or phosgene. As a result of the at least partial use of polycarbonates having hydroxyl groups, the resistance of the polyurethane or polyurethane urea dispersion adhesives to hydrolysis can be improved.

Suitable polyether polyols are for example the polyaddition products of styrene oxides, ethylene oxide, propylene oxide, tetrahydrofuran, butylene oxide, epichlorohydrine, and mixed addition and grafting products thereof, and the polyether polyols obtained from condensation of polyhydric alcohols or mixtures thereof and from alkoxylation of polyhydric alcohols, amines and amino alcohols. Polyether polyols which are suitable as structural components A) are the homopolymers, mixed polymers and graft polymers of propylene oxide and ethylene oxide which are obtainable by the addition of the said epoxies to low-molecular-weight diols or triols, such as those mentioned above as structural components for polyester polyols, or to higher-functional low-molecular-weight polyols such as pentaerythritol or sugar, or to water.

Other suitable components A) are low-molecular-weight diols, triols and/or tetraols such as ethanediol, di-, tri-, tetraethylene glycol, 1,2-propanediol, di-, tri-, tetrapropylene glycol, 1,3-propanediol, butanediol-1,4, butanediol-1,3, butanediol-2,3, pentanediol-1,5, hexanediol-1,6, 2,2-dimethyl-1,3-propanediol, 1,4-dihydroxycyclohexane, 1,4-dimethylol cyclohexane, octanediol-1,8, decanediol-1,10, dodecanediol-1,12, neopentyl glycol, 1,4-cyclohexane diol, 1,4-cyclohexane dimethanol, 1,4-, 1,3-, 1,2-dihydroxybenzene or 2,2-bis-(4-hydroxyphenyl)-propane (bisphenol A), TCD-diol, trimethylol propane, glycerine, pentaerythritol, dipentaerythritol or mixtures thereof, optionally also using further diols or triols which are not mentioned.

Suitable polyols are reaction products of the said polyols, in particular low-molecular-weight polyols, with ethylene and/or propylene oxide.

The low-molecular-weight components A) preferably have a molecular weight of 62 to 400 g/mol and are preferably used in combination with the polyester polyols, polylactones, polyethers and/or polycarbonates mentioned above.

Preferably, the content of polyol component A) in the polyurethane according to the invention is 20 to 95, particularly preferably 30 to 90, and most particularly preferably 65 to 90 wt. %.

Suitable as component B) are any organic compounds which have at least two free isocyanate groups in each molecule. Preferably, diisocyanates $Y(NCO)_2$ are used, wherein Y represents a divalent aliphatic hydrocarbon radical having 4 to 12 carbon atoms, a divalent cycloaliphatic hydrocarbon radical having 6 to 15 carbon atoms, a divalent aromatic carbon radical having 6 to 15 carbon atoms or a divalent araliphatic hydrocarbon radical having 7 to 15 carbon atoms. Examples of such diisocyanates which are preferably used are tetramethylene diisocyanate, methylpentamethylene diisocyanate, hexamethylene diisocyanate, dodecamethylene diisocyanate, 1,4-diisocyanato-cyclohexane, 1-isocyanato-3,3,5-trimethyl-5-isocyanatomethyl-cyclohexane (=IPDI, isophorone diisocyanate), 4,4'-diisocyanato-dicyclohexyl-methane, 4,4'-diisocyanato-dicyclohexylpropane-(2,2), 1,4-diisocyanatobenzene, 2,4-diisocyanatotoluene, 2,6-diisocyanatotoluene, 4,4'-diisocyanato-diphenylmethane, 2,2'- and 2,4'-diisocyanato-diphenylmethane, tetramethyl xylylene diisocyanate, p-xylylene diisocyanate, p-isopropylidene diisocyanate and mixtures of these compounds.

In addition to these simple diisocyanates, also suitable are those polyisocyanates which contain hetero atoms in the radical linking the isocyanate groups and/or have a functionality of more than 2 isocyanate groups in each molecule. The first are for example polyisocyanates which are obtained by modifying simple aliphatic, cycloaliphatic, araliphatic and/or aromatic diisocyanates and which comprise at least two diisocyanates with a uretdione, isocyanurate, urethane, allophanate, biuret, carbodiimide, iminooxadiazinedione and/or oxadiazinetrione structure. As an example of a non-modified polyisocyanate having more than 2 isocyanate groups in each molecule there may for example be mentioned 4-isocyanatomethyl-1,8-octane diisocyanate (nonane triisocyanate).

Preferred diisocyanates B) are hexamethylene diisocyanate (HDI), dodecamethylene diisocyanate, 1,4-diisocyanato-cyclohexane, 1-isocyanato-3,3,5-trimethyl-5-isocyanatomethyl-cyclohexane (=IPDI), 4,4'-diisocyanato-dicyclohexyl-methane, 2,4-diisocyanatotoluene, 2,6-diisocyanatotoluene, 4,4'-diisocyanato-diphenylmethane, 2,2'- and 2,4'-diisocyanato-diphenylmethane and mixtures of these compounds.

Particularly preferred components B) are hexamethylene diisocyanate and 1-isocyanato-3,3,5-trimethyl-5-isocyanatomethyl-cyclohexane.

The content of component B) in the polyurethane according to the invention is from 5 to 60, preferably from 6 to 45, and particularly preferably from 7 to 25 wt. %.

Suitable components C) are for example components containing sulfonate or carboxylate groups, such as diamine compounds or dihydroxyl compounds which additionally contain sulfonate and/or carboxylate groups, such as the sodium, lithium, potassium, tert.-amine salts of N-(2-aminoethyl)-2-aminoethane sulfonic acid, N-(3-aminopropyl)-2-aminoethane sulfonic acid, N-(3-aminopropyl)-3-aminopropane sulfonic acid, N-(2-aminoethyl)-3-aminopropane sulfonic acid, analogous carboxylic acids, dimethylol propionic acid, dimethylol butyric acid, the reaction products from a Michael addition of 1 mol of diamine such as 1,2-ethane diamine or isophorone diamine with 2 mol of acrylic acid or maleic acid.

The acids are frequently used directly in the form of their salt as a sulfonate or carboxylate. However, it is also possible to add the neutralising agent needed for formation of the salt in portions or in its entirety only during or after the polyurethanes have been prepared.

For forming salts, particularly suitable and preferred tert. amines are for example triethylamine, dimethyl cyclohexylamine and ethyl diisopropylamine. It is also possible to use other amines for the salt formation, such as ammonia, diethanolamine, triethanolamine, dimethylethanolamine, methyldiethanolamine, aminomethyl propanol, and also mixtures of the said and indeed other amines. It is sensible to add these amines only after the prepolymer has been formed.

It is also possible to use other neutralising agents, such as sodium, potassium, lithium or calcium hydroxide for neutralising purposes.

Other suitable components C) are mono- or difunctional polyethers which have a non-ionic hydophilising action and are based on ethylene oxide polymers or ethylene oxide/propylene oxide copolymers which are started on alcohols or amines, such as polyether LB 25 (Bayer MaterialScience AG; Germany) or MPEG 750: methoxypolyethylene glycol, molecular weight 750 g/mol (e.g. Pluriol® 750, BASF AG, Germany).

Preferably, components C) are N-(2-aminoethyl)-2-aminoethane sulfonate and the salts of or dimethylol propionic acid and dimethylol butyric acid.

Preferably, the content of component C) in the polyurethane according to the invention is 0.1 to 15 wt. %, particularly preferably 0.5 to 10 wt. %, very particularly preferably 0.8 to 5 wt. % and even more particularly preferably 0.9 to 3.0 wt. %.

Suitable components D) are mono-, di-, trifunctional amines and/or mono-, di-, trifunctional hydroxylamines, such as aliphatic and/or alicyclic primary and/or secondary monoamines such as ethylamine, diethylamine, isomeric propyl and butyl amines, higher linear aliphatic monoamines and cycloaliphatic monoamines such as cyclohexylamine. Further examples are amino alcohols, that is compounds which contain amino and hydroxyl groups in one molecule, such as ethanolamine, N-methyl ethanolamine, diethanolamine, diisopropanolamine, 1,3-diamino-2-propanol, N-(2-hydroxyethyl)-ethylene diamine, N,N-bis(2-hydroxyethyl)-ethylene diamine and 2-propanolamine. Further examples are diamines and triamines, such as 1,2-ethane diamine, 1,6-hexamethylene diamine, 1-amino-3,3,5-trimethyl-5-aminomethyl cyclohexane (isophorone diamine), piperazine, 1,4-diamino cyclohexane, bis-(4-aminocyclohexyl)-methane and diethylene triamine. Also possible are adipic acid dihydrazide, hydrazine and hydrazine hydrate. It goes without saying that mixtures of a plurality of the said compounds D), optionally also those with compounds that are not mentioned, may also be used.

Preferred components D) are 1,2-ethane diamine, 1-amino-3,3,5-trimethyl-5-aminomethyl cyclohexane, diethylene triamine, diethanolamine, ethanolamine, N-(2-hydroxyethyl)-ethylene diamine and N,N-bis(2-hydroxyethyl)-ethylene diamine.

Compounds D) preferably serve as chain extenders for creating higher molecular weights or as monofunctional compounds for limiting molecular weights and/or optionally additionally for incorporating further reactive groups, such as free hydroxyl groups as further crosslink points.

Preferably, the content of component D) in the polyurethane according to the invention is from 0 to 10, particularly preferably from 0 to 5, and most particularly preferably from 0.2 to 3 wt. %.

Components E) which may optionally also be used may for example be aliphatic, cycloaliphatic or aromatic monoalcohols having 2 to 22 C atoms, such as ethanol, butanol, hexanol, cyclohexanol, isobutanol, benzyl alcohol, stearyl alcohol, 2-ethyl ethanol, cyclohexanol; blocking agents which are conventional for isocyanate groups and may be split again at elevated temperature, such as butanone oxime, dimethylpyrazole, caprolactam, malonic esters, triazole, dimethyl triazole, tert.-butyl-benzyl amine, cyclopentanone carboxyethyl ester.

Preferably, the content of components E) in the polyurethane according to the invention may be in quantities from 0 to 20, most preferably from 0 to 10 wt. %.

The use of component E) may for example result in polyurethane dispersions according to the invention which in addition to the reactive carboxyl groups contain further reactive groups for example enabling the application of different curing mechanisms (dual cure) in order to achieve specific properties, such as a two-stage, optionally staggered cure, or a particularly high crosslink density.

The polyurethane and polyurethane polyurea polymers used according to the invention preferably contain di- or higher-functional polyester polyols A), based on linear dicarboxylic acids and/or derivatives thereof, such as anhydrides, esters or acid chlorides and aliphatic or cycloaliphatic, linear or branched polyols. Particularly preferred are dicarboxylic acids selected from the group comprising adipic acid, succinic acid, sebacic acid and dodecane diacid, and most particularly preferred as component A) is adipic acid. These are used in quantities of at least 80 mol %, preferably from 85 to 100 mol %, particularly preferably from 90 to 100 mol %, in relation to the total quantity of all carboxylic acids.

Optionally, other aliphatic, cycloaliphatic or aromatic dicarboxylic acids may also be used. Examples of such dicarboxylic acids are glutaric acid, azelaic acid, 1,4-, 1,3- or 1,2-cyclohexane dicarboxylic acid, terephthalic acid or isophthalic acid. These are used in quantities of at most 20 mol %, preferably from 0 to 15 mol %, particularly preferably from 0 to 10 mol %, in relation to the total quantity of all carboxylic acids.

Preferred polyol components for the polyesters A) are selected from the group comprising monoethylene glycol, propanediol-1,3, butanediol-1,4, pentanediol-1,5, hexanediol-1,6 and neopentyl glycol, and particularly preferred as the polyol component are butanediol-1,4 and hexanediol-1,6, and most particularly preferred is butanediol-1,4. These are preferably used in quantities of at least 80 mol %, particularly preferably from 90 to 100 mol %, in relation to the total quantity of all polyols.

Optionally, other aliphatic or cycloaliphatic, linear or branched polyols may also be used. Examples of polyols of this kind are diethylene glycol, hydroxypivalic acid neopentyl glycol, cyclohexane dimethanol, pentanediol-1,5, pentanediol-1,2, nonanediol-1,9, trimethylol propane, glycerine or pentaerythritol. These are used in quantities of preferably at most 20 mol %, particularly preferably from 0 to 10 mol %, in relation to the total quantity of all polyols.

Mixtures of two or more polyesters A) of this kind are also possible.

Polyesters A) based on adipic acid and 1,4-butanediol or adipic acid and 1,6-hexanediol or adipic acid and a mixture of 1,6-hexanediol and neopentyl glycol are preferably used.

The polyurethane dispersions according to the invention preferably have solids contents of preferably from 15 to 70 wt. %, particularly preferably from 25 to 60 wt. %, and most particularly preferably from 30 to 50 wt. %. The pH is preferably in the range from 4 to 11, particularly preferably from 6 to 10.

The waterborne polyurethane or polyurethane urea dispersions according to the invention may be prepared such that the components A), B) optionally C) and optionally E) are reacted in a single-stage or multi-stage reaction to give an isocyanate-functional prepolymer which is then, optionally with component C) and optionally D), reacted in a single-stage or two-stage reaction and then dispersed in or using water, wherein solvent used therein may optionally be removed, partially or entirely, by distillation during or after the dispersion.

The waterborne polyurethane or polyurethane urea dispersions according to the invention may be prepared in one or more stages in a homogeneous or, in the case of a multi-stage reaction, partly in a disperse phase. After the polyaddition has been partially or entirely performed, a step of dispersion, emulsification or solution is carried out. Then a further polyaddition or modification in a disperse phase is optionally carried out. For the preparation, any methods known from the prior art may be used, such as the emulsifier/shear force method, acetone method, prepolymer mixing method, melting/emulsifying method, ketimine method and spontaneous dispersion of solids method, or derivatives thereof. A summary of these methods can be found in *Methoden der organischen Chemie* (Houben-Weyl, supplemental volumes to the 4th edition, Volume E20, H. Bartl and J. Falbe, Stuttgart, New York, Thieme 1987, pp. 1671-1682). The melting/emulsifying method, prepolymer mixing method and acetone method are preferred. The acetone method is particularly preferred.

In principle, it is possible to measure out all the components—all the hydroxy-functional components—together, and then to add all the isocyanate-functional components and react them to give an isocyanate-functional polyurethane, which is then reacted with the amino-functional components. Preparation is also possible the other way round, that is taking the isocyanate component, adding the hydroxy-functional components, reacting to give polyurethane and then reacting with the amino-functional components to give the end product.

Conventionally, all or some of the hydroxy-functional components A), optionally C) and optionally E) for preparing a polyurethane prepolymer are put into the reactor, optionally diluted with a water-miscible solvent which is, however, inert to isocyanate groups, and then homogenised. Then the component B) is added at room temperature to 120° C. and an isocyanate-functional polyurethane is prepared. This reaction may be performed in a single stage or in multiple stages. A multi-stage reaction may be carried out for example in that a component C) and/or E) is reacted with the isocyanate-functional component B) and then a component A) is added thereto and can then be reacted with some of the isocyanate groups that are still present.

Suitable solvents are for example acetone, methyl isobutyl ketone, butanone, tetrahydrofuran, dioxan, acetonitrile, dipropylene glycol dimethyl ether and 1-methyl-2-pyrrolidone, which may be added not only at the start of preparation but optionally also later in portions. Acetone and butanone are preferred. It is possible to perform the reaction at standard pressure or under elevated pressure.

To prepare the prepolymer, the quantities of hydroxyl-functional and, optionally, amino-functional components that are used are such that a ratio of isocyanate of preferably 1.05 to 2.5, particularly preferably 1.15 to 1.95, most particularly preferably 1.2 to 1.7 is produced.

The further reaction, the so-called chain extension, of the isocyanate-functional prepolymer with further hydroxy- and/or amino-functional, preferably only amino-functional components D) and optionally C) is performed such that a degree of conversion of preferably 25 to 150%, particularly preferably 40 to 85%, of hydroxyl and/or amino groups in relation to 100% isocyanate groups is selected.

In the case of degrees of conversion greater than 100%, which are possible but less preferred, it is appropriate first to react all the components which are monofunctional for the isocyanate addition reaction with the prepolymer, and then to use the di- or higher-functional chain-extending components to obtain the greatest possible degree of incorporation of all the chain-extending molecules.

Conventionally, the degree of conversion is monitored by tracking the NCO content of the reaction mixture. For this, both spectroscopic measurements, such as infrared or near infrared spectra or determination of the refractive index, and chemical analyses such as the titration of samples may be carried out.

To accelerate the isocyanate addition reaction, conventional catalysts such as those known to those skilled in the art for acceleration of NCO—OH reactions may be used. Examples are triethylamine, 1,4-diazabicyclo-[2,2,2]-octane, dibutyltin oxide, tin dioctoate or dibutyltin dilaurate, tin-bis-(2-ethyl hexanoate), zinc dioctoate, zinc-bis-(2-ethyl hexanoate) or other organo-metallic compounds.

The chain of the isocyanate-functional prepolymer may be extended with the component D) and optionally C) before, during or after dispersion. Preferably, the chain extension is carried out before dispersion. If component C) is used as the chain-extending component, then it is imperative that chain extension with this component be carried out before the dispersion step.

Conventionally, the chain extension is carried out at temperatures of 10 to 100° C., preferably from 25 to 60° C.

The term chain extension, in the context of the present invention, also includes the reactions of optionally monofunctional components D) which, as a result of their monofunctionality, act as chain terminators and thus result not in an increase but a limitation of the molecular weight.

The components of chain extension may be added to the reaction mixture diluted with organic solvents and/or water. They may be added successively, in any order, or at the same time by adding a mixture.

For the purpose of preparing the polyurethane dispersion, the prepolymer may either be added to the dispersion liquid, optionally under pronounced shear, such as vigorous stirring, or conversely the dispersion liquid is stirred into the prepolymer. Then the chain extension step is carried out, unless this has already been done in the homogeneous phase.

During and/or after dispersion, the organic solvent which is optionally used, such as acetone, is distilled off.

A preferred preparation method is described below:

Component A), optionally component C) and optionally component E) and optionally solvent are heated to 20 to 100° C. Component B) is measured in as quickly as possible, with stirring. The reaction mixture is stirred at 40 to 150° C., making use of the heat that is generated, until the theoretical isocyanate content is reached or almost reached. During this, a catalyst may optionally be added. Then, solvent is added in order to dilute the mixture to a solids content of 25 to 95, preferably 35 to 80 wt. %, and then the chain extension is performed by adding component D), diluted with water and/or solvent, optionally together with component C), at 30 to 120° C. After a reaction time of 2 to 60 minutes, dispersion is performed by adding distilled water or by transferring the mixture into distilled water, and the solvent used is partially or entirely distilled off during or after the dispersion step.

The dispersions according to the invention may be used by themselves or with the binders, auxiliary substances and additives known from coatings and adhesives technology, in particular emulsifiers and light stabilisers such as UV absorbers and sterically hindered amines (HALS), furthermore anti-oxidants, extenders and auxiliary substances, such as anti-sedimentation agents, defoaming and/or wetting agents, levelling agents, reactive diluents, plasticisers, neutralising agents, catalysts, co-solvents and/or thickeners and additives, such as pigments, colorants or matting agents. Tackifiers may also be added.

The additives may be added to the products according to the invention directly before processing. However, it is also possible to add at least some of the additives before or during dispersion of the binder.

The selection and the metering of these substances, which may be added to the individual components and/or the entire mixture, are in principle known to those skilled in the art and may be determined by simple preliminary tests, tailored to the specific application without unduly great expense.

In an alternative embodiment, the polyurethane, polyurea or polyurethane polyurea polymer has ethylenically unsaturated double bonds. Preferably, these groups are incorporated into the polymer by using appropriate proportions of hydroxy-functional components A), C) or E) which have acrylate and/or methacrylate groups [called (meth)acrylate hereinbelow) in the preparation of the polymers. The proportion of hydroxy-functional components of this kind is limited by the fact that the polymer is to retain its crystalline or partly crystalline properties, with the result that a proportion by weight of below 75%, preferably below 50%, in particular below 30% of component A is (meth)acrylate-functional. Preferred hydroxy-functional (meth)acrylates are selected from the group comprising 2-hydroxyethyl (meth)acrylate, polyethylene oxide mono(meth)acrylates, polypropylene oxide mono(meth)acrylates, polyalkylene oxide mono(meth)acrylates, poly(ε-caprolactone) mono(meth) acrylates, such as Pemcure®12A (Cognis, Düsseldorf, Germany), 2-hydroxypropyl (meth)acrylate, 4-hydroxybutyl (meth)acrylate, 3-hydroxy-2,2-dimethylpropyl (meth)acrylate and acrylic acid and/or methacrylic acid partial esters of polyhydric alcohols such as trimethylolpropane, glycerine, pentaerythritol, dipentaerythritol, sorbitol, ethoxylated, propoxylated or alkoxylated trimethylolpropane, glycerine, pentaerythritol, dipentaerythritol or mixtures thereof. Particularly preferred are acrylic acid esters of monoalcohols. Also suitable are alcohols which can be obtained by reacting acids having double bonds with monomeric epoxy compounds, optionally having double bonds, for example the reaction products of (meth)acrylic acid with glycidyl (meth) acrylate or the glycidyl ester of versatic acid.

Furthermore, compounds containing isocyanate-reactive oligomeric or polymeric unsaturated (meth)acrylate groups may be used by themselves or in combination with the above-mentioned monomeric compounds. The use of polyester acrylates containing hydroxyl groups and having an OH content of ≥30 mg KOH/g to ≤300 mg KOH/g is preferred, the use of those having an OH content of ≥60 mg KOH/g to ≤200 mg KOH/g is particularly preferred, and the use of those having an OH content of ≥70 mg KOH/g to ≤120 mg KOH/g is most particularly preferred. In the preparation of hydroxy-functional polyester acrylates, a total of seven groups of monomer constituents may be used:

1. (Cyclo)alkanediols such as dihydric alcohols having (cyclo)aliphatically bonded hydroxyl groups in the range of molecular weights of ≥62 g/mol to ≤286 g/mol, for example ethanediol, 1,2- and 1,3-propanediol, 1,2-, 1,3- and 1,4-butanediol, 1,5-pentanediol, 1,6-hexanediol, neopentyl glycol, cyclohexane-1,4-dimethanol, 1,2- and 1,4-cyclohexanediol, 2-ethyl-2-butyl propanediol, diols containing ether oxygen, such as diethylene glycol, triethylene glycol, tetraethylene glycol, dipropylene glycol, tripropylene glycol, polyethylene, polypropylene or polybutylene glycols having a molecular weight of ≥200 g/mol to ≤4000 g/mol, preferably ≥300 g/mol to ≤2000 g/mol, particularly preferably ≥450 g/mol to ≤1200 g/mol. Reaction products of the above-mentioned diols with ε-caprolactone or other lactones may also be used as diols.
2. Tri- and higher-valent alcohols in the range of molecular weights of ≥92 g/mol to ≤254 g/mol, such as glycerine, trimethylol propane, pentaerythritol, dipentaerythritol and sorbitol or polyethers started on these alcohols, such as the reaction product of 1 mol of trimethylol propane and 4 mol of ethylene oxide.
3. Monoalcohols such as ethanol, 1- and 2-propanol, 1- and 2-butanol, 1-hexanol, 2-ethyl hexanol, cyclohexanol and benzyl alcohol.
4. Dicarboxylic acids in the range of molecular weights of ≥104 g/mol to ≤600 g/mol and/or anhydrides thereof, such as phthalic acid, phthalic acid anhydride, isophthalic acid, tetrahydrophthalic acid, tetra-hydrophthalic acid anhydride, hexahydrophthalic acid, hexahydrophthalic acid anhydride, cyclohexane dicarboxylic acid, maleic acid anhydride, fumaric acid, malonic acid, succinic acid, succinic acid anhydride, glutaric acid, adipic acid, pimelic acid, suberic acid, sebacic acid, dodecane diacid, hydrated dimeric fatty acids.
5. Higher-functional carboxylic acids or anhydrides thereof, such as trimellitic acid and trimellitic acid anhydride.
6. Monocarboxylic acids, such as benzoic acid, cyclohexane carboxylic acid, 2-ethyl hexanoic acid, caproic acid, caprylic acid, capric acid, lauric acid, natural and synthetic fatty acids.
7. Acrylic acid, methacrylic acid or dimeric acrylic acid.

Suitable polyester acrylates containing hydroxyl groups include the reaction product of at least one constituent from group 1 or 2 with at least one constituent from group 4 or 5 and at least one constituent from group 7. Optionally, groups that have a dispersive action can also be incorporated into these polyester acrylates. For example, as the alcohol component, polyethylene glycols and/or methoxy polyethylene glycols may also be used in appropriate proportions. Possible compounds which may be mentioned are polyethylene glycols and polypropylene glycols started on alcohols, block copolymers thereof and the monomethyl ethers of these polyglycols. Particularly suitable are polyethylene glycol-1500 and/or polyethylene glycol-500 monomethyl ethers.

It is also possible, after esterification, to react some carboxyl groups, in particular those of (meth)acrylic acid, with mono-, di- or polyepoxy compounds. For example, the epoxies (glycidyl ethers) of monomeric, oligomeric or polymeric bisphenol A, bisphenol F, hexanediol, butanediol and/or trimethylolpropane or the ethoxylated and/or propoxylated derivatives thereof are preferred. This reaction may in particular be used to increase the OH value of the polyester (meth)acrylate, since a respective OH group is produced during the epoxy acid reaction. The acid value of the resulting product is preferably between ≥0 mg KOH/g and ≤20 mg KOH/g, particularly preferably between ≥1 mg KOH/g and ≤10 mg KOH/g, and most particularly preferably between ≥2 mg KOH/g and ≤5 mg KOH/g. The reaction is preferably catalysed by catalysts such as triphenyl phosphine, thiodiglycol, ammonium and/or phosphonium halides and/or zirconium or tin compounds such as tin(II) ethylhexanoate.

Also preferred are epoxy (meth)acrylates which contain hydroxyl groups and have OH contents of ≥20 mg KOH/g to ≤300 mg KOH/g, particularly preferred are those having OH contents of ≥100 mg KOH/g to ≤280 mg KOH/g, most particularly preferred are those having OH contents of ≥150 mg KOH/g to ≤250 mg KOH/g, or polyurethane (meth)acrylates which contain hydroxyl groups and preferably have OH contents of ≥20 mg KOH/g to ≤300 mg KOH/g, particularly preferred are those having OH contents of ≥40 mg KOH/g to ≤150 mg KOH/g, most particularly preferred are those having OH contents of ≥50 mg KOH/g to ≤100 mg KOH/g and mixtures thereof with one another and mixtures with unsaturated polyesters which contain hydroxyl groups and mixtures with polyester (meth)acrylates or mixtures of unsaturated polyesters which contain hydroxyl groups with polyester (meth)acrylates. Epoxy (meth)acrylates which contain hydroxyl groups are in particular based on reaction products of acrylic acid and/or methacrylic acid with epoxies (glycidyl compounds) of monomeric, oligomeric or polymeric bisphenol A, bisphenol F, hexanediol and/or butanediol or the ethoxylated and/or propoxylated derivatives thereof.

Monomers which can polymerise by radical polymerisation are ethylenically unsaturated compounds and are preferably selected from the group comprising esters of acrylic acid, esters of methacrylic acid, esters of crotonic acid, vinyl ethers, vinyl esters and vinyl-aromatic compounds. Preferably, the ethylenically unsaturated compounds include aromatic or cycloaliphatic groups. They conventionally have a molecular weight of below 500 g/mol. Particularly preferred are esters of acrylic and methacrylic acid, in particular those having a functionality of acrylic and/or methacrylic acid groups [called "(meth)acrylate" herein below] of 2 or below. Corresponding compounds may be used by themselves or in a mixture.

Vinyl esters of carboxylic acids having 1 to 20 C atoms are for example vinyl laurate or stearate, vinyl propionate, versatic acid vinyl esters and vinyl acetate. As the vinyl ethers, vinyl methyl ether or vinyl isobutyl ether may for example be mentioned. Vinyl ethers of alcohols having 1 to 4 C atoms are preferred. Possible vinyl-aromatic compounds are vinyl toluene, o- and p-methyl styrene, o-butyl styrene, 4-n-butyl styrene, 4-n-decyl styrene and preferably styrene.

Here, most particularly preferred are ethylenically unsaturated compounds having a cycloaliphatic or aromatic group. Ethylenically unsaturated compounds of this kind are for example selected from the group comprising phenoxyethyl (meth)acrylate, phenoxy(ethoxy)$_n$-ethyl (meth)acrylate, bisphenol A ethoxylate ethyl (meth)acrylate with average degrees of ethoxylation where n=0.1 to 4.0, cyclohexyl (meth)acrylate, the isomeric tert.-butyl cyclohexyl (meth) acrylates, norbornyl, isobornyl, dicyclopentadienyl or tetrahydrofurfuryl (meth)acrylate, cyclic trimethylolpropane formal (meth)acrylate and tricyclodecane dimethanol di(meth)acrylate. Even more preferred are tetrahydrofuran (meth)acrylate, tricyclodecane dimethanol di(meth)acrylate and dicyclopentadienyl (meth)acrylate.

Preferably, the waterborne dispersion contains 8 to 40 wt. %, particularly preferably 12 to 30 wt. %, in relation to the solids content, of at least one monomer which can polymerise by radical polymerisation.

Photoinitiators are initiators which may be activated by actinic radiation and trigger radical polymerisation of the ethylenically unsaturated compounds. The activating radiation is actinic, for example UV and/or visible light having a wavelength of 200 to 750 nm, preferably 200 to 600 nm, particularly preferably 200 to 500 nm.

Photoinitiators are compounds which are known per se and are commercially available, a distinction being made between unimolecular (type I) and bimolecular (type II) initiators. Type I systems are for example aromatic ketone compounds such as benzophenones combined with tertiary amines, alkylbenzophenone, 4,4'-bis(dimethylamino)benzophenone (Michler's ketone), anthrone and halogenated benzophenones or mixtures of the said types. Also suitable are type II initiators such as benzoin and its derivatives, benzilketals, acylphosphine oxides, for example 2,4,6-trimethyl-benzoyl-diphenylphosphine oxide, bisacylphosphine oxides, phenylglyoxylic acid ester, camphorquinone, α-aminoalkyl phenones, α,α-dialkoxyacetophenones and α-hydroxyalkylphenones. It may also be advantageous to use mixtures of these compounds. Suitable initiators are commercially available, for example under the name Irgacure® and Darocur® (BASF SE, Ludwigshafen, Germany) and Esacure® (Fratelli Lamberti, Adelate, Italy).

Photoinitiators are used in concentrations which are known to those skilled in the art and/or which are optionally to be determined by simple preliminary tests. Here, in particular the wavelength, intensity and dose of UV radiation during irradiation are to be taken into account. Concentrations of 0.1 wt. % to 10.0 wt. % are preferred, those of 0.5 wt. % to 8.0 wt. % are particularly preferred, those of 1.0 wt. % to 4.5 wt. % are even more preferred, in each case in relation to the solids content of the waterborne dispersion.

Incorporation of the monomer which can polymerise by radical polymerisation and the photoinitiator may be performed in different ways. However, either may be incorporated by itself or together at different points during or after the polymer has been prepared. If solid photoinitiators are used, the monomer may preferably first be used as a solvent for the photoinitiator. It is possible to use the monomer and/or the photoinitiator as a solvent already at the stage of preparing the polymer and to emulsify it with the polymer in water. In particular the prepolymer mixing method and the melting/dispersing method are suitable for using the monomer and/or the photoinitiator as a solvent and thus reducing the viscosity of the polymer/prepolymer melt or solution, which is advantageous for forming an emulsion. If the monomer or photoinitiator has functional groups that participate in the reaction when the polymer is prepared, then the relevant compound may be added only after synthesis of the polymer.

However, it is also possible to incorporate photoinitiators and/or ethylenically unsaturated compound into the emulsion of the polymer in water afterwards. For this, shear forces are required, and these may be applied by stirrers, dispergators and mixers, in particular static mixers. From the point of view of method, these are known methods of incorporating hydrophobic or partly hydrophilic liquids into polymer emulsions. It is possible, but not preferred, to assist the incorporation by means of auxiliary substances such as emulsifiers or substances capable of forming protective colloids.

The waterborne dispersion according to the invention preferably has a solids content of 5 to 75 wt. %. The solids content and viscosity should in particular be suited to the application behaviour and the desired film layer resulting after drying. Depending on the substances used, the solids content can be adjusted over a broad range, in particular in the range from 5 to 55 wt. %, by preparing a concentrated dispersion and subsequent dilution with water. The viscosity and other rheological properties may be controlled to adjust the rheology over a broad range, as is known and conventional in the technology of waterborne coatings, by generally available thickeners and/or additives. Preferably, for an application by brush, the product is adjusted to a solids content of preferably 35 to 55 wt. %, particularly preferably 45-55 wt. %, to give newtonian or shear-thinning rheological properties.

Possible crosslinking agents are preferably polyisocyanates or indeed latent-reactive or blocked polyisocyanates, polyaziridines and polycarbodiimides and possibly also melamines. Hydrophilised polyisocyanates are particularly preferred for waterborne coatings. The quantity and functionality of the crosslinking agents should in particular be matched to the desired strength of the adhesive bond, in particular under thermal load, and optionally determined by simple tests. Furthermore, when selecting the crosslinking agent, the temperature required for the reaction of the crosslinking agent in the adhesive during curing should be matched to the drying and curing behaviour.

Many of the possible crosslinking agents reduce the storage life of the coating, since they already undergo slow reaction in the waterborne dispersion. For this reason, the crosslinking agents should be added correspondingly just before application. Depending on the degree of hydrophilicity, to incorporate the crosslinking agent in the waterborne dispersion corresponding methods which are known per se, such as stirring in with appropriate shear force, dispersion or incorporation using mixers, should be used. Hydrophilised polyisocyanates are available for example under the name Desmodur® and Bayhydur® (Bayer MaterialScience AG, Leverkusen, Germany) and Rhodocoat® (Perstorp, Sweden).

The present invention further provides a method for bonding articles, including at least the following steps:
I) coating an article with the waterborne dispersion according to the invention;
II) removing water;
III) irradiating with actinic radiation;
IV) simultaneously with or after III), introducing heat into the irradiated film;
V) bringing the article into contact with itself or a further article.

In principle, the method according to the invention is suitable for any substrates which are to be bonded. It is used in particular with those substrates to which conventional waterborne heat-activatable adhesives adhere to an only unsatisfactory extent. For example, these are ethylene vinyl acetate copolymers (EVA), e.g. Phylon, compression moulded EVA or dye cut EVA, but also rubber such as SBR (styrene/butadiene rubber), NBR (nitrile/butadiene rubber), TR (thermoplastic rubber), natural rubber, EPDM (ethylene/propylene/diene rubber), polyolefins and other thermoplastic materials and mixtures thereof.

It is possible to apply the dispersion according to the invention in step I) over the full surface or only to one or more parts of the surface of the article.

Before the substrate is coated with the dispersion according to the invention in step I), it may optionally undergo one or more pretreatments. It is preferable here to clean the surfaces to be bonded of dust, dirt, grease and any adhering mould release agents resulting from preparation of the substrate. Here, this cleaning may be performed by washing and/or mechanical work. For washing, solvents or preferably aqueous cleaning solutions may be used. Washing becomes significantly more effective in combination with mechanical intervention such as wiping, brushing, radiation or ultrasound treatment. A further treatment of the surface by high-energy radiation, in particular ionising radiation such as plasma, or the activation of the surface by ozone or mechanical roughening may be advantageous in particular cases. It goes without saying that it is also possible to use primers, but this is less preferable, since one of the advantages of the method according to the invention is specifically that it has no need of primers.

The dispersion according to the invention is preferably applied in step I) by brushing, dipping or spraying. Also possible are roller coating, blade coating, flow coating, casting, printing methods and transfer methods. Application should exclude the use of radiation, which can result in premature reaction of the photoinitiators or polymerisation of the double bonds.

The water is removed in step II). Preferably, the water is removed by drying at elevated temperature in ovens, with air that is moved and optionally also dehumidified (convection ovens, jet driers) and thermal radiation (IR, NIR). Microwaves may also be used. It is possible and advantageous to combine a plurality of these drying methods.

Advantageously, the conditions for drying are selected such that the maximum temperature reached remains below the threshold at which the substrate deforms in an uncontrolled manner or undergoes other damage.

In step III), the article is irradiated with actinic radiation. Advantageously, during this the thermal energy which is introduced into the layer during drying is utilised.

The radiation curing is preferably performed under the action of high-energy radiation, that is UV radiation or daylight, preferably light in the wavelength from ≥200 nm to ≤750 nm. As the radiation sources for light or UV light there serve for example medium- or high-pressure mercury vapour lamps, wherein the mercury vapour can be modified by doping with other elements such as gallium or iron. Laser, pulsed lamps (known under the name of UV flash lamps), halogen lamps or excimer radiation means may also be used. The radiation means may be installed in a fixed location such that the article to be irradiated is moved past the radiation source by means of a mechanical device, or the radiation means may be movable and the article to be irradiated does not change location as it is cured. The radiation dose which is conventionally sufficient for curing with UV curing is in the range from ≥80 $mJ/cm^2$ to ≤5000 $mJ/cm^2$ with a radiation intensity of ≥80 $mW/cm^2$ to ≤3000 $mW/cm^2$.

Radiation may optionally also be carried out with the exclusion of oxygen, for example under an inert gas atmosphere or oxygen-depleted atmosphere. Suitable inert gases are preferably nitrogen, carbon dioxide, noble gases or combustion gases. Furthermore, irradiation may be performed by covering the dried layer with media which are transparent to radiation. Examples of these are for example synthetic films, glass or liquids such as water.

Depending on the radiation dose, radiation intensity, distance and other curing conditions, the type and concentration of the photoinitiator used should be varied or optimised in a manner known to those skilled in the art or by using preliminary tests as a guide. To cure the dried dispersion on three-dimensional surfaces of complex shape, it is particularly advantageous to perform the curing using a plurality of radiation means, the arrangement whereof should be selected such that each point of the coating is as far as possible given the optimum radiation dose and intensity for curing. In particular, the existence of regions which are not irradiated (in shadow) should be avoided.

For the most complete possible polymerisation of the double bonds in the dried dispersion, the highest possible temperature during irradiation and the highest possible intensity and dose have proved advantageous. Conversely, it may be advantageous, depending on the article used, to select the irradiation conditions such that the thermal load on the article is not too great. In particular, thin articles or articles made of materials having a low glass transition temperature may tend towards uncontrolled deformation if the irradiation results in a particular temperature being exceeded. In these cases, it is advantageous to allow as little infrared radiation as possible to act on the article, using suitable filters or the construction of the radiation means. Furthermore, by reducing the corresponding radiation dose it is possible to counter the uncontrolled deformation. Here, however, it is important to note that for the most complete possible polymerisation, a certain dose and intensity of irradiation are required. In these cases, it is particularly advantageous to cure under inert or oxygen-depleted conditions, since when the proportion of oxygen in the atmosphere above the dried dispersion is reduced, the dose required for curing lessens.

It is particularly preferred to use mercury radiation means in fixed installations for curing. To cure these coatings, preferably a dose of ≥200 mJ/cm$^2$ to ≤2000 mJ/cm$^2$ with a radiation intensity of ≥100 mW/cm$^2$ to ≤2000 mW/cm$^2$ is used.

In step IV), heat is introduced into the irradiated layer, as a result of which the crystalline or partly crystalline constituents of the dried dispersion are activated. Here, it is possible to use the heat which was optionally introduced during irradiation in step III) and thereafter to proceed directly to step V). However, it is also possible to perform the activation at a later stage by supplying heat again. Preferably, this is achieved by a brief dwell time in ovens at elevated temperature (convection ovens, jet driers) and/or by thermal irradiation (IR, NIR). Microwaves may also be used.

Finally, the heat may also be transferred by the second article being brought into contact with the article which was coated with the dried dispersion according to the invention. This article, which is optionally provided with an adhesive layer, may be heated by methods as described for step IV) and this heat used to activate the crystalline or partly crystalline constituents in the dried dispersion.

In step VI), the two articles are bonded by the application of pressure, optionally at elevated temperature. The bonding step itself has no particular method features but corresponds to the prior art. The conditions under which the bonding is performed should be adapted to the adhesive films and substrates used. They may be determined by those skilled in the art using simple tests.

Optionally, the bonding step may be followed by another heat treatment, in which the adhesive bond is kept at an elevated temperature in order to react any crosslink agents which may be present. Furthermore, this may be followed by cooling, as a result of which the bonded articles are cooled to room temperature again.

The invention also provides articles which are made by the method according to the invention. Articles made by the method according to the invention are for example shoes, in particular sports shoes, sports items such as balls, rackets and equipment, and furthermore furniture, textiles, foils and composites thereof, items from the sector of computers, telecommunications and consumer electronics, automotive vehicles and aircraft and in particular interior parts.

EXAMPLES

The present invention will be explained in more detail with reference to the examples below. In these examples, the units used have the following significance:

Viscosities: Rotary viscometer (from Haake, type VT 550), measurements at 23° C. and shear rates—unless otherwise indicated—of D 1/40 s$^{-1}$.

Unless otherwise indicated, figures given in percentages in the examples are weight percentages.

In the examples, the compounds listed under their trade names are as follows:

Dispercoll® U 54—anionic high-molecular-weight polyurethane dispersion (approximately 50% solids content), Bayer MaterialScience AG, Leverkusen, Germany (U 54) for preparing heat-activatable waterborne adhesives.

Dispercoll U XP 2682—anionic polyurethane dispersion (approximately 50% solids content), Bayer MaterialScience AG, Leverkusen, Germany (XP 2682) for preparing waterborne adhesives which may be activated by heat at low temperature.

Desmodur® DN—hydrophilic aliphatic polyisocyanate which is emulsifiable in waterborne polymer dispersions, based on hexamethylene diisocyanate (HDI). NCO content 21.8%; viscosity 1250 mPa·s. Bayer MaterialScience AG, Leverkusen, Germany.

Borchi® Gel L 75 N—polyurethane-based non-ionic liquid thickener. OMG Borchers GmbH, Langenfeld, Germany.

Irgacure® 500, Irgacure 819 DW, Lucirin® TPO-L—photoinitiators, BASF SE, Ludwigshafen, Germany.

Esacure® TZT—photoinitiator, Fratelli Lamberti SpA, Adelate, Italy.

The following monomers were sourced from SARTOMER, a division of CRAY VALLEY, F-92062—PARIS LA DÉFENSE CEDEX, France:
SR256 2-(2-ethoxyethoxy)ethyl acrylate (EOEOEA)
SR285 tetrahydrofurfuryl acrylate (THFA)
SR339C 2-phenoxyethyl acrylate (PEA)
SR506D isobornyl acrylate (IBOA)
SR423 isobornyl methacrylate (IBOMA)
SR833S tricyclodecanedimethanol diacrylate (TCDDA)

The following monomers were sourced from BASF SE, Ludwigshafen, Germany:
Laromer® DCPA dihydrocyclopentadienyl acrylate (DCPA)
Laromer® HDDA 1,6-hexanediol diacrylate (HDDA)
Substrates:
EVA1—Injection moulded EVA midsole Phylon containing approximately 16% vinyl acetate EVA2—Compression moulded EVA midsole Phylon containing approximately 20% vinyl acetate EVA3—Injection moulded EVA midsole Phylon containing approximately 18% vinyl acetate Leather test substrate: SATRA standard upper leather (from SATRA UK)

Rubber—black shoe sole rubber made of NBR (based on 73% polybutadiene rubber BR150L from Ube Industries Ltd.)

Determining the Enthalpy of Fusion of the Melting Peak of Anionic Polyurethane Dispersions Using Differential Scanning Calorimetry (DSC)—DIN 65467-A Dried polymer films of Dispercoll U 54 and U XP 2682 respectively were produced by casting the dispersion in Teflon moulds and then allowing them to dry at room temperature for seven days. Pieces having a mass of 10 mg were cut out of these films and put into DSC crucibles which were then sealed with lids in the crucible press. The crucibles were put in the measurement cell of the calorimeter at room temperature and cooled to −100° C. They were then heated three times in the temperature range from −100° C. to +100° C. The heating rate was 20 K/min, and cooling was carried out at 320 K/min between the heating stages. The thermal coupling between the cooling block and the measurement cell was created by flushing with nitrogen while a compressor cooled the measurement cell.

For U 54 a melting peak at +48.5° C. with an enthalpy of fusion of 51.3 J/g was found, whereas XP 2682 had a peak at +51.0° C. with an enthalpy of fusion of 64.5 J/g (values derived from 1st heating in each case).

Preparation of a Mixture of a Polyurethane Dispersion, a UV-Curable (Meth)Acrylate Monomer and Photoinitiator(s)

To the quantities of the said polyurethane dispersion indicated in the respective test table there was added, with vigorous stirring, the quantity of the said monomer indicated in the respective test table.

After stirring for 5 min, the quantity of the said photoinitiator indicated in the respective test table was added, again with vigorous stirring. Then the solids content was adjusted to 50% using demineralised water. After stirring for 5 min, the formulation was left to stand overnight.

Preparation of a Waterborne Heat-Activatable Post-Curing Adhesive

To 100.0 g of Dispercoll U 54 there was added, with vigorous stirring, 4.0 g of Desmodur DN. After stirring for 5 min, 1.0 g of a 20% solution of Borchi Gel L 75 N in water was added, again with vigorous stirring. After stirring for 5 min, the formulation was left to stand for 30 min. After this the viscosity was 1250 mPa·s. The adhesive formulation was used within 2.5 hours of preparation, because of the pot life resulting from the crosslinking isocyanate Desmodur DN.

Preparation of an Aqueous Cleaning Solution 50.0 g of sodium hydroxide, 10.0 g of a commercially available rinsing agent, Falterol (cleaning agent concentrate containing 30% of active substance, Falter Chemie GmbH & CO KG, Krefeld), 50.0 g of isopropanol and 890.0 g of water were mixed and dissolved.

Pretreatment of EVA or Rubber Substrates

Variant A: Using Solvent

Surfaces to be bonded were cleaned using a cellulose cloth soaked in ethyl acetate, wiping five times with a light pressure. Then, the surfaces were left uncovered for at least one hour in a well-ventilated place.

Variant B: Using the Aqueous Cleaning Solution

Surfaces to be bonded were immersed in the aqueous cleaning solution in an ultrasound bath and cleaned for 10 min using ultrasound. Then, excess liquid was allowed to drip off the surfaces and they were briefly immersed in a 5% solution of citric acid. After excess liquid had once again been allowed to drip off, the surfaces were rinsed once with demineralised water and left uncovered for at least one hour in a well-ventilated place.

Application of a Dispersion to EVA or Rubber, Drying and UV Irradiation

A strip of EVA or rubber substrate as indicated in the test table, 3 cm wide and 10 cm long, was coated with waterborne dispersion as indicated in the test table. Application to the substrate was performed evenly using approximately 150 g/m² (wet) with a fine brush (Chinese hog brush). Then the specimen was dried briefly at 30° C. in a circulating air oven until the water had been removed from the film. UV irradiation was carried out with a gallium-doped medium-pressure mercury radiation means (lamp output adjustable: 60, 80 or 120 W/cm of lamp length). Unless indicated otherwise, irradiation was carried out immediately after drying, at the stated peak intensity and dose (measured using a dosimeter IL 390 C from International Light Inc.).

Bonding to Leather of an EVA or Rubber Substrate Coated with Dispersion and Irradiated with UV A piece of leather 3 cm wide and 10 cm long was coated twice in succession with the waterborne heat-activatable post-curing adhesive. Application was performed with a fine brush (Chinese hog brush) using approximately 150 g/m² (wet). After each application, the adhesives were dried for 5 min at 65° C. in a circulating air oven. The dispersion-coated, dried and irradiated EVA or rubber strip indicated in the test table was activated under heat, in both cases at 65° C., or not activated according to the test table and, after the two adhesive-coated surfaces of EVA or rubber strip and leather strip had been laid against one another, they were immediately pressed in a flat press (from PROTOS Schuhmaschinen Frankfurt am Main, Germany, 4 bar line pressure, 30 s).

The strength of the adhesive bond was tested after 3 days using a peel test (180° peel at a tensile testing rate of 100 mm/min, to DIN EN 1392). During this, an assessment was made of whether the material of the substrates tore (positive result) or whether the bond was broken (negative result).

TEST TABLE 1

Effect of the monomer

| Example | Dispersion Polymer | Quantity [g] | Monomer | Quantity [g] | Substrate | Tensile test Material torn after 3 days |
|---|---|---|---|---|---|---|
| 1 (V) | U 54 | 200 | (none) | — | EVA3 | no |
| 2 (V) | U 54 | 200 | (none) | — | EVA1 | no |
| 3 | U 54 | 200 | EOEOEA | 20 | EVA3 | partly |
| 4 | U 54 | 200 | EOEOEA | 20 | EVA1 | no |
| 5 | U 54 | 200 | THFA | 20 | EVA3 | yes |
| 6 | U 54 | 200 | THFA | 20 | EVA1 | yes |
| 7 | U 54 | 200 | PEA | 20 | EVA3 | partly |
| 8 | U 54 | 200 | PEA | 20 | EVA1 | no |
| 9 | U 54 | 200 | DCPA | 20 | EVA3 | yes |
| 10 | U 54 | 200 | DCPA | 20 | EVA1 | yes |
| 11 | U 54 | 200 | IBOA | 20 | EVA3 | partly |
| 12 | U 54 | 200 | IBOA | 20 | EVA1 | no |
| 13 | U 54 | 200 | IBOMA | 20 | EVA3 | partly |
| 14 | U 54 | 200 | TCDDA | 20 | EVA3 | yes |
| 15 | U 54 | 200 | TCDDA | 20 | EVA1 | yes |
| 16 | U 54 | 200 | HDDA | 20 | EVA3 | partly |
| 17 | XP | 200 | TCDDA | 20 | EVA3 | yes |

TEST TABLE 1-continued

Effect of the monomer

| | Dispersion | | | | Tensile test Material torn after 3 days |
|---|---|---|---|---|---|
| Example | Polymer | Quantity [g] | Monomer | Quantity [g] | Substrate | |

| Example | Polymer | Quantity [g] | Monomer | Quantity [g] | Substrate | after 3 days |
|---|---|---|---|---|---|---|
| 18 | XP 2682 | 200 | TCDDA | 20 | EVA1 | yes |

As the photoinitiator, 2.0% Irgacure 500 was used in all the tests. The EVA was cleaned using solvent. Application and drying were as described above; irradiation was at peak intensity 1700 mW/cm² at a dose of 1200 mJ/cm². Followed by bonding to leather as described above, without separate activation of the EVA strip.

Comparison examples 1(V) and 2(V) show that without any monomer a good adhesive bond is not achieved. The examples according to the invention show that certain monomers give better adhesive bonds, depending on the properties of the substrate.

TEST TABLE 3

Effect of proportions of PUD and monomer

| Example | Polymer | Quantity [g] | Monomer | Quantity [g] | Substrate | Tensile test Material torn after 3 days |
|---|---|---|---|---|---|---|
| 19 | XP 2682 | 200 | TCDDA | 19 | EVA3 | partly |
| 20 | XP 2682 | 200 | TCDDA | 17 | EVA3 | partly |
| 21 | XP 2682 | 200 | TCDDA | 15 | EVA3 | yes |
| 22 | XP 2682 | 200 | TCDDA | 13 | EVA3 | no |
| 23 | XP 2682 | 200 | TCDDA | 11 | EVA3 | no |
| 24 (V) | —* | —* | TCDDA | 200 | EVA3 | no |

*) TCDDA was processed using 0.2% Disponil FES 32 (emulsifier, Cognis SE, Düsseldorf, Germany) and an Ultra-Turrax to give a 20% emulsion, albeit of limited storage life.

As the photoinitiator, 2.0% Irgacure 819 DW was used in all the tests. The EVA was cleaned with water. Application and drying were as described above; irradiation was at peak intensity 150 mW/cm² at a dose of 550 mJ/cm². Followed by bonding to leather as described above, without separate activation of the EVA strip.

Tests 19-23 show that the combination of PUD and monomer gives good results over a broad range of concentrations, but quantities below 15 g of monomer are insufficient. The monomer alone [24 (V)] does not give a good bond.

TEST TABLE 4

Different substrates

| Example | Polymer | Quantity [g] | Monomer | Quantity [g] | Substrate | Tensile test Material torn after 3 days |
|---|---|---|---|---|---|---|
| 25 | XP 2682 | 200 | TCDDA | 19 | EVA3 | partly |
| 26 | XP 2682 | 200 | TCDDA | 19 | EVA1 | yes |
| 27 | XP 2682 | 200 | TCDDA | 19 | EVA2 | yes |
| 28 | XP 2682 | 200 | TCDDA | 19 | Rubber | yes |
| 29 (V) | XP 2682 | 200 | — | — | EVA3 | no |
| 30 (V) | XP 2682 | 200 | — | — | EVA1 | no |
| 31 (V) | XP 2682 | 200 | — | — | EVA2 | no |
| 32 (V) | XP 2682 | 200 | — | — | Rubber | no |

As the photoinitiator, 2.0% Irgacure 819 DW was used in all the tests. The EVA was cleaned with water. Application and drying were as described above; irradiation was at peak intensity 150 mW/cm² at a dose of 550 mJ/cm². Followed by bonding to leather as described above, without separate activation of the EVA strip.

Tests 25-28 show that a dispersion according to the invention using the method according to the invention gives good bonding on various substrates, whereas in comparison tests 29 (V)-32 (V), with no UV-curable portion in the dispersion, a sufficient bond is not achieved.

Test 26 was repeated and compared with test 27, with the EVA strip being activated, in addition to the leather strip, at 65° C. in a circulating air oven just before bonding. All the other test parameters were kept unchanged. In both tests, the tensile test led to the material being torn after 3 days.

The invention claimed is:

1. A method for bonding articles, comprising
   I) coating an article with a waterborne dispersion comprising from 30.0 to 94.9 weight % of a polymer selected from the group consisting of crystalline or partly crystalline polyurethane, polyurea, and polyurethane polyurea,
   from 5.0 to 60.0 weight % of a monomer which can polymerise by radical polymerisation,
   from 0.1 to 10.0 weight % of a photoinitiator, and
   optionally, from 0.5 to 15.0 weight % of a crosslinking agent,
   wherein the weight percent relating to the solids content of said waterborne dispersion adds up to 100, and
   wherein, when measured by DSC to DIN 65467 at a heating rate of 20K/min, the polymer has a melting peak corresponding to an enthalpy of fusion of >3 J/g;
   II) removing water;
   III) irradiating with actinic radiation to form an irradiated film;
   IV) simultaneously with or after III), introducing heat into the irradiated film; and
   V) bringing the article into contact with a further article wherein the further article is coated with the waterborne dispersion of step I) or with another adhesive which is activated by heat.
2. The method of claim 1, wherein the article has not been treated with a primer before it is coated with the waterborne dispersion.
3. The method of claim 1, wherein the article has not been pretreated with a plasma or with ozone before it is coated with the waterborne dispersion.

4. The method of claim 1, wherein the article comprises a material selected from the group consisting of ethylene vinyl acetate copolymers, rubber, styrene/butadiene rubber, nitrile/butadiene rubber, thermoplastic rubber, natural rubber, ethylene/propylene/diene rubber, polyolefins, thermoplastic materials, and mixtures thereof.

5. The method of claim 4, wherein the further article comprises leather.

6. The method of claim 1, wherein the article comprises an ethylene vinyl acetate copolymer and the further article comprises leather.

7. The method of claim 1, wherein the monomer which can polymerise by radical polymerisation is selected from the group consisting of phenoxyethyl (meth)acrylate, phenoxy(ethoxy)$_n$-ethyl (meth)acrylate, bisphenol A ethoxylate ethyl (meth)acrylate with average degrees of ethoxylation where n=0.1 to 4.0, cyclohexyl (meth)acrylate, the isomeric tert.-butyl cyclohexyl (meth)acrylates, norbornyl, isobornyl, dicyclopentadienyl or tetrahydrofurfuryl (meth)acrylate, cyclic trimethylolpropane formal (meth)acrylate, and tricyclodecane dimethanol di(meth)acrylate.

8. The method of claim 1, wherein the waterborne dispersion comprises from 70 to 85 weight % of a polymer selected from the group consisting of crystalline or partly crystalline polyurethane, polyurea, and polyurethane polyurea,
   from 8.0 to 40.0 weight % of tetrahydrofuran (meth)acrylate, tricyclodecane dimethanol di(meth)acrylate or dicyclopentadienyl (meth)acrylate,
   from 0.1 to 4.5 weight % of a photoinitiator, and optionally, from 0.5 to 15.0 weight % of a crosslinking agent.

9. The method of claim 8, wherein the article comprises a material selected from the group consisting of ethylene vinyl acetate copolymers, rubber, styrene/butadiene rubber, nitrile/butadiene rubber, thermoplastic rubber, natural rubber, ethylene/propylene/diene rubber, polyolefins, thermoplastic materials, and mixtures thereof.

10. An article prepared by the method of claim 1.

* * * * *